United States Patent
Shirakawa (10) Patent No.: US 7,782,249 B2
(45) Date of Patent: Aug. 24, 2010

(54) DETECTION AND RANGING DEVICE AND DETECTION AND RANGING METHOD

(75) Inventor: Kazuo Shirakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 80 days.

(21) Appl. No.: 12/368,367

(22) Filed: Feb. 10, 2009

(65) Prior Publication Data

US 2009/0224978 A1    Sep. 10, 2009

(30) Foreign Application Priority Data

Mar. 4, 2008    (JP)    .............................. 2008-053506

(51) Int. Cl.
*G01S 13/00*    (2006.01)
(52) U.S. Cl. ...................... 342/147; 342/118
(58) Field of Classification Search .......... 342/118–158
See application file for complete search history.

(56) References Cited

U.S. PATENT DOCUMENTS

| | | | |
|---|---|---|---|
| 6,545,639 B1 * | 4/2003 | Barnard ...................... 342/378 |
| 2002/0126045 A1 | 9/2002 | Kishigami et al. |
| 2004/0027282 A1 | 2/2004 | Kishigami et al. |
| 2004/0189523 A1 | 9/2004 | Kishigami et al. |
| 2006/0233389 A1 * | 10/2006 | Mao et al. ...................... 381/92 |
| 2008/0122681 A1 | 5/2008 | Shirakawa |
| 2009/0201206 A1 * | 8/2009 | Li et al. ...................... 342/373 |

FOREIGN PATENT DOCUMENTS

| | | |
|---|---|---|
| EP | 1 850 147 | 10/2007 |
| JP | 2001-320324 | 11/2001 |
| JP | 2001-345807 | 12/2001 |
| JP | 2002-243826 | 8/2002 |
| JP | 2005-181168 | 7/2005 |
| WO | 2006/067869 | 6/2006 |

OTHER PUBLICATIONS

Jingmin Xin, et al. "Computationally Efficient Subspace-Based Method for Direction-of-Arrival Estimation Without Eigendecomposition" IEEE Transaction on Signal Processing, vol. 52, No. 4, Apr. 2004, pp. 876-893.

* cited by examiner

*Primary Examiner*—Thomas H Tarcza
*Assistant Examiner*—Timothy A Brainard
(74) *Attorney, Agent, or Firm*—Katten Muchin Rosenman LLP (57) ABSTRACT

A pseudo-spatial-average-covariance-matrix generating unit selects, from matrixes $R_{f1}$, $R_{f2}$, $R_{b1}$ and $R_{b2}$, one appropriate matrix or two or more appropriate matrixes for combination to generate a pseudo-spatial-average-covariance matrix R. A pseudo-spatial-average-covariance-matrix Hermitian-conjugate product generating unit generates a target-count-estimation matrix $RR^H$. A target-count-estimation-matrix decomposing unit performs LU decomposition on $RR^H$ into a lower triangular matrix L and an upper triangular matrix U. An index generating unit generates an index using elements of the upper triangular matrix U. An index-parameter scanning unit estimates a target count by using the index generated by the index generating unit.

13 Claims, 7 Drawing Sheets

DETECTION AND RANGING DEVICE AND DETECTION AND RANGING METHOD

CROSS-REFERENCE TO RELATED APPLICATION

This application is based upon and claims the benefit of priority of the prior Japanese Patent Application No. 2008-053506, filed on Mar. 4, 2008, the entire contents of which are incorporated herein by reference.

BACKGROUND

1. Field

The present invention relates to a detection and ranging device and detection and ranging method with a transmission sensor array and a reception sensor array that is formed of n ($2 \leq n$) sensor elements, estimating a target count indicating the number of targets based on reflected signals of transmission signals sent from the transmission sensor array and reflected from the targets, and estimating an angle at which each reflected signal comes based on the target count.

2. Description of the Related Art

Conventionally, in a detection and ranging device having a sensor array formed of a plurality of sensor elements as a reception antenna to detect the target count and the position of each target based on reflected waves of transmission waves coming from a transmission sensor array and reflected from the targets, it is important in device performance how accurately the number of reflected waves and their coming directions can be detected.

Figure 7:
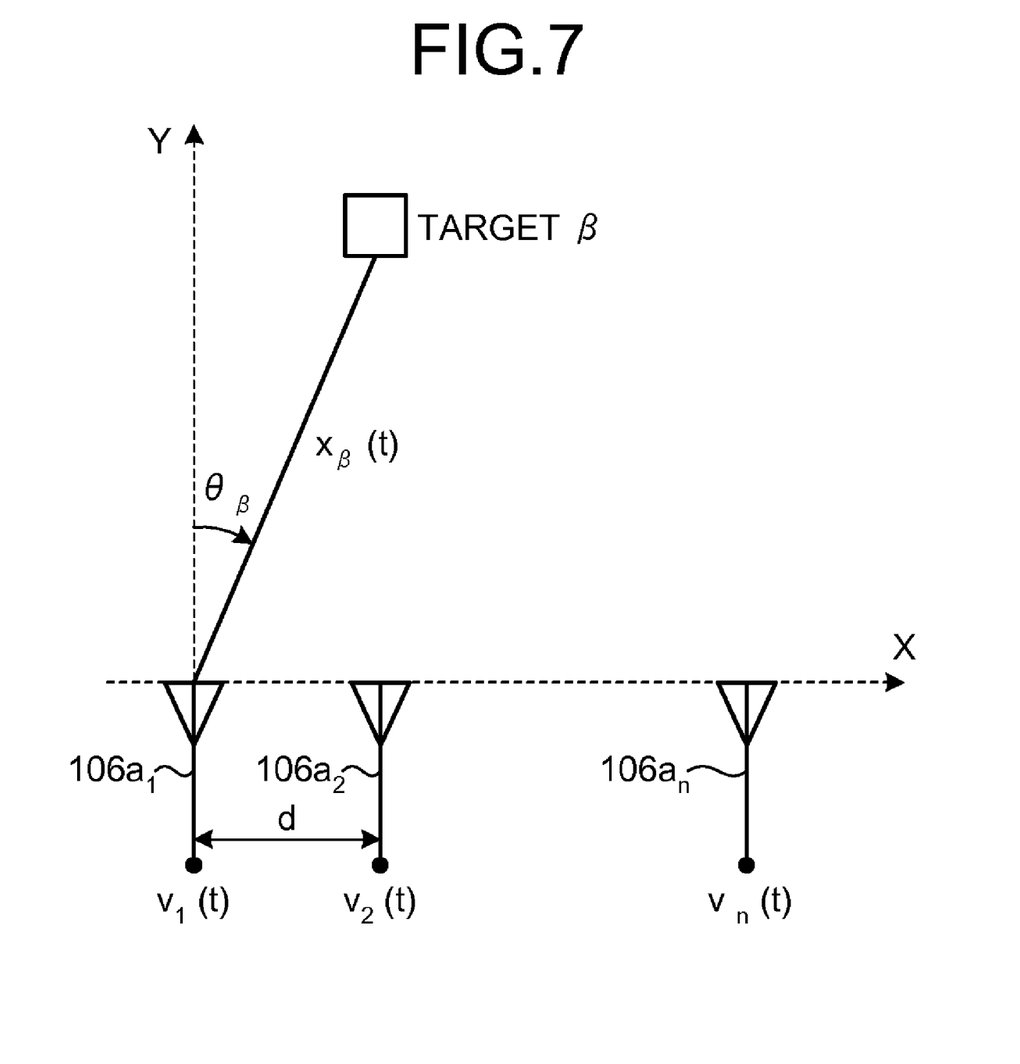
FIG. 7 is a drawing of a relation between the arrangement of a sensor array and a reflected wave from a target.

For example, as depicted in FIG. 7, it is assumed that, to a uniformly spaced linear array antenna (hereinafter, START Uniform Linear Array (ULA)) formed of n sensor elements (sensor elements $106a_1$ to $106a_n$) arranged on an X axis so that a distance between adjacent sensor elements is d, independent echo signals reflected from m targets β (reflection of transmission waves) are incident at each different angle $\theta_\beta$ (an angle measured with the position of the sensor element $106a_1$ being taken as a coordinate origin, the normal to the X axis being taken as an Y axis, and further a clockwise direction with reference to a positive direction of the Y axis (arrow direction of the Y axis) being taken as a positive direction of the angle), where β is a target number with $\beta = 1, 2, \ldots, m$.

Here, a signal $v_\alpha(t)$ obtained by demodulating the signal received by an α-th ($\alpha = 1, 2, \ldots, n$) sensor element at a time t can be represented by the following equation, where the first sensor element $106a_1$ is taken as a phase reference, $x_\beta(t)$ is a baseband signal, and $n_\alpha(t)$ is an additive Gaussian noise signal of power σ:

$$v_\alpha(t) = \sum_{\beta=1}^{m} x_\beta(t)\exp(j\phi_{\alpha,\beta}) + n_\alpha(t)(\alpha = 1, 2, \ldots, n) \quad (1)$$

In Equation 1, "exp" is an exponential function with natural logarithm in base, and j is an imaginary unit. Also, $\phi_{\alpha,\beta}$ is defined in the following equation, where λ is a wavelength of a carrier signal of a transmission wave:

$$\phi_{\alpha,\beta} \equiv \frac{2\Pi}{\lambda}(\alpha - 1)d\sin\theta_\beta \quad (2)$$

Then, Equation 1 for all α can be represented with a vector V(t) as in the following equation:

$$V(t) = \begin{bmatrix} \sum_{\beta=1}^{m} x_\beta(t)\exp(j\varphi_{1,\beta}) + n_1(t) \\ \vdots \\ \sum_{\beta=1}^{m} x_\beta(t)\exp(j\varphi_{n,\beta}) + n_n(t) \end{bmatrix} = AX(t) + N(t) \quad (3)$$

Here, an angular vector (mode vector) $a(\theta_\beta)$ is defined by the following equation:

$$a(\theta_\beta) \equiv \begin{bmatrix} \exp(j\phi_{1,\beta}) \\ \vdots \\ \exp(j\phi_{n,\beta}) \end{bmatrix} (\beta = 1, 2, \ldots, m) \quad (4)$$

A matrix A, a vector X(t), and a vector N(t) in Equation 3 are defined as in the following equations:

$$A \equiv [a(\theta_1) \ldots a(\theta_m)] = \begin{bmatrix} \exp(j\phi_{1,1}) & \ldots & \exp(j\phi_{1,m}) \\ \vdots & & \vdots \\ \exp(j\phi_{n,1}) & \ldots & \exp(j\phi_{n,m}) \end{bmatrix} \quad (5)$$

$$x(t) \equiv [x_1(t), \ldots, x_m(t)]^T \quad (6)$$

$$N(t) \equiv [n_1(t), \ldots, n_n(t)]^T \quad (7)$$

Note that a superscript "T" appearing in "$[x_1(t), \ldots, x_m(t)]^T$" in Equation 6 and "$[n_1(t), \ldots, n_n(t)]^T$" in Equation 7 represents a transpose of a vector or matrix.

When a covariance matrix $R_{vv}$ of V(t) is calculated from Equation 3 assuming that X(t) and N(t) are not correlated with each other, Equation 8 below holds, where "I" in Equation 8 represents a unit matrix and σ is power of the noise signal as explained above:

$$R_{vv} \equiv E[V(t)V^H(t)] = AR_{xx}A^H + \sigma^2 I \quad (8)$$

$R_{vv}$ represented in Equation 8 is a generic operand when angle estimation of the target is performed. Here, a superscript "H" attached as "$V^H(t)$" and "$A^H$" represents a Hermitian conjugate of a vector or matrix. $R_{xx}$ is a covariance matrix of the baseband signals, and is defined by the following equation:

$$R_{xx} \equiv E[X(t)X^H(t)] \quad (9)$$

Here, since the echo signal received by the ULA is none other than a transmission signal generated from the identical signal source and reflected from the target, the Rank of the n-order matrix $R_{vv}$ reduces to 1. Therefore, if calculations, such as an inverse-matrix operation and eigenvalue decomposition, were tried on to the original covariance matrix $R_{vv}$, they may not be able to be performed.

To solve this problem, a scheme of taking (n−L+1) L-order square submatrixes in a main diagonal direction of $R_{vv}$ and adding them together for averaging (Forward Spatial Smoothing (FSS)), a scheme of reversing the reference point of the ULA to perform a similar operation (Backward Spatial Smoothing (BSS)), or a combination thereof (FBSS) is conventionally used.

For example, in MUltiple SIgnal Classification (MUSIC), an L-order square matrix $R_{vv}^{FBSS}$ obtained in this manner is first subjected to eigenvalue decomposition as in the following equation to find a matrix EN formed of eigenvectors corresponding to a noise eigenvalue:

$$R_{VV}^{FBSS} = E\Lambda E^H (= E_S \Lambda_S E_S^H + \sigma^2 E_N E_N^H) \quad (10)$$

In Equation 10, $\Lambda$, $\Lambda_S$, and E are as follows, where $\Lambda_S$ is a matrix formed of an eigenvalue $\lambda_\beta$ ($\beta=1, 2, \ldots, m$) of the reflected signal (target echo), $E_S$ is a matrix formed of eigenvectors ($E_1$ to $E_m$, sometimes referred as signal-eigenvectors) which span signal-subspace, $\sigma^2 I_L$ is a L-order unit matrix multiplied by noise power $\sigma^2$, and $E_N$ is a matrix formed of eigenvectors ($E_{m+1}$ to $E_L$, sometimes referred as noise-eigenvectors) which span over a noise-subspace, and where "diag[$\lambda_1, \ldots, \lambda_m$]" appearing in Equation 12 for $\Lambda_S$ represents a diagonal matrix having diagonal elements of $\lambda_1, \ldots, \lambda_m$:

$$\Lambda = \begin{bmatrix} \Lambda_S & 0 \\ 0 & 0_{L-m} \end{bmatrix} + \sigma^2 I_L \quad (11)$$

$$\Lambda_S = \text{diag}[\lambda_1, \ldots, \lambda_m] \quad (12)$$

$$E \equiv [E_S | E_N] \equiv [E_1 \ldots E_m | E_{m+1} \ldots E_L] \quad (13)$$

Then, the angle $\theta_\beta$ of the target $\beta$ is estimated with Equation 14 below. That is, by using the angular vector $a(\theta)$ defined by Equation 4 with $\theta$ as a parameter, angular information included in the L-order square matrix $R_{vv}^{FBSS}$ is scanned to find an angle when a peak appears in $P_{music}(\theta)$, thereby performing angle estimation for each target $\beta$ ($\beta=1, 2, \ldots, m$)

$$P_{music}(\theta) = \frac{a^H(\theta) a(\theta)}{a^H(\theta) E_N E_N^H a(\theta)} \quad (14)$$

To correctly perform angle estimation, it is required to select a submatrix of an appropriate size L (in FBSS, L≧m+1 and n−L+1≧m) according to target count m, and by applying spatial average to recover the Rank of $R_{vv}$ to find $E_N$ of a correct size.

However, in general, the target count m is unknown. Therefore, conventionally, an arbitrary L is set to find $R_{vv}^{FBSS}$, an eigenvalue of a diagonal element of that matrix $\Lambda$ is found, and then, for example, a statistical index Akaike's Information Criterion (AIC)(i) defined by Equation 15 below is introduced, thereby estimating the feasible target count, where $N_D$ in Equation 15 represents the number of data samples:

$$AIC(i) \equiv -N_D(L-i) \log \left\{ \left( \prod_{j=i+1}^{L} \lambda_j \right)^{\frac{1}{L-i}} \bigg/ \frac{1}{L-i} \sum_{j=i+1}^{L} \lambda_j \right\} + i(2L-i) \quad (15)$$

A value p of a parameter i (natural number) that gives a minimum value in Equation 15 is assumed to show the reasonable target count and is parametrically found by Equation 16 below, where "arg min[AIC(i)]" in Equation 16 represents an operation of scanning the parameter i to find a minimum value of "AIC(i)" by:

$$p = \underset{i}{\arg\min}[AIC(i)] \quad (16)$$

As a matter of course, relevance of the result of Equation 16 cannot be ensured unless estimation of $\Lambda$ is relevant. Therefore, the value "L" in Equation 15 has to be variously changed within an allowable range to try calculations by Equation 16. This requires a large amount of calculation even only for eigenvalue decomposition by Equation 10, thereby increasing the processing time and further increasing the calculation load.

Furthermore, as is evident from Equation 11, to the diagonal element of $\Lambda$, a noise component is always superposed even to a signal-component portion. Therefore, in particular, for the use in an environment where a Signal to Noise Ratio (SNR) (hereinafter, S/N ratio) is poor, such as in a vehicle-mounted radar, reliability of target-count estimation is extremely low.

Moreover, in a detection and ranging device achieving a target angle estimating function by using a sensor array, it is often the case that an algorithm that necessitates correct estimation of the target count is adopted as a preprocess for angle estimation. However, to compensate coherency of a probe signal (transmission signal from the device) by spatial average and recover the Rank of the signal covariance matrix to achieve successful estimation of the target count, the target count has to be correctly estimated, posing a recursive algorithm-structure problem.

For this reason, a calculation by applying spatial average by using a submatrix with its size arbitrarily taken as a kind of parameter to find an eigenvalue of the obtained spatial average matrix for evaluation with a statistical index, such as AIC, has to be performed by trial and error, while the size of the submatrix is being changed by turns.

Still further, calculation for eigenvalue decomposition of an n-order matrix requires an amount of calculation on the order of $4n^3$, for example. Since this calculation is performed parametrically in target-count estimation, an approximately ten-fold amount of calculation is further required. For this reason, it is difficult to achieve applications to vehicle-mounted radars with low central processing units (CPU) performance and mobile devices requiring rapid updates of detection and ranging information. Still further, to all diagonal elements of the diagonal matrix obtained through eigenvalue decomposition on a normal signal covariance matrix, noise power is added, which makes estimation extremely vulnerable to deterioration in S/N ratio.

For this reason, to ensure reliability of angle estimation, as disclosed in Japanese Patent Application Laid-open No. 2005-181168, for example, a wave-number estimating device is suggested that generates a covariance matrix $E[XX^H]=R_{xx}$ of a time-domain data vector X, performs Fast Fourier Transform (FFT) on the time-domain data vector X to clip a signal equal to or smaller than an appropriate threshold, performs Inverse Fast Fourier Transform (IFFT) to generate a white data vector Y (in other words, data Y is obtained by applying the white-noise method to data X), performs Cholesky decomposition on a covariance matrix of the data vector Y with $E[YY^H]=LL^H$ to generate a matrix $R=L^{-1}R_{xx}L^{-H}$ in which correlation waves were suppressed, and then performs eigenvalue decomposition on R, thereby increasing accuracy of AIC.

Also, to reduce the amount of calculation for angle estimation, as disclosed in Japanese Patent Application Laid-open No. 2002-243826, for example, an electromagnetic-wave incoming-direction estimating device is suggested that generates a covariance matrix $E[XX^H]=R_{xx}$ of a data vector X, performs eigenvalue decomposition with $R_{xx}=E_S \Lambda_S E_S^H + \sigma^2 E_N E_N^H$, performs Cholesky decomposition on a matrix formed of noise eigenvectors with $E_N E_N^H = LL^H$, and then calculates an angular spectrum $P(\theta)=a^H(\theta)a(\theta)/|L^Ha(\theta)|^2$ (where $a(\theta)$ represents an angular vector (mode vector) with $\theta$ as a parameter) by using as a lower triangular matrix, thereby reducing the calculation load of angle estimation and the like.

Furthermore, as disclosed in International Patent Publication No. 2006/67869, for example, an incoming-wave estimating device is suggested that generates, when estimating the number of incoming waves received by an array antenna, a correlation matrix based on array covariance matrixes based on the incoming waves, generates an estimation matrix for estimating the number of incoming waves by using this correlation matrix, performs QR decomposition on this estimation matrix, and then estimates the number of incoming waves based on the elements on each row of an upper triangular matrix as a result of QR decomposition, thereby estimating the number of incoming waves without performing eigenvalue decomposition with a large calculation load.

However, in the conventional technology typified by Japanese Patent Application Laid-open No. 2005-181168 and Japanese Patent Application Laid-open No. 2002-243826, in the case of an n-order matrix, the amount of calculation required for eigenvalue decomposition is on the order of $8n^3/3$ to $4n^3$. Furthermore, when even eigenvectors are also to be stored, an amount of calculation on the order of $20n^3$ at minimum is required, thereby increasing the processing load.

In the conventional technology typified by Japanese Patent Application Laid-open No. 2002-243826, relevance of the result of angle estimation cannot be ensured unless estimation of the target count m is correct. Therefore, it is required to variously change the size L of the submatrix for use in calculation of a spatial average matrix within an allowable range to try target-count estimation many times. That is, time is required not only for eigenvalue calculation itself but also for trial and error process, requiring an enormous amount of calculation, but it is not always the case that an appropriate result of angle estimation can be obtained in return for the increased computation load.

Furthermore, in the conventional technology typified by International Patent Publication No. 2006/67869, by using an index based on the elements of the upper triangular matrix R as a result of QR decomposition on a pseudo covariance matrix in which a noise influence is extremely low, the target count can be estimated more quickly and accurately. However, although in this technology, the pseudo covariance matrix is decomposed into an orthogonal matrix Q and an upper triangular matrix R which diagonal elements are eigenvalues of the pseudo covariance matrix, the amount of calculation required is on the order of $4n^3/3$ in the case of an n-order matrix, which is still large in view of the calculation load. Therefore, it is difficult to apply the conventional technology to low-performance CPUs or mobile terminals.

SUMMARY

It is an object of the present invention to at least partially solve the problems in the conventional technology.

According to an aspect of an embodiment, a detection and ranging device with a transmission sensor array and a reception sensor array that is formed of n ($2 \leq n$) sensor elements, estimating a target count indicating the number of targets based on reflected signals of transmission signals sent from the transmission sensor array and reflected from the targets, and estimating an angle at which each reflected signal comes based on the target count, includes a correlation-vector generating unit that generates correlation vectors based on outputs of the n sensor elements of the reception sensor array; a pseudo-spatial-average-covariance-matrix calculating unit that calculates a pseudo-forward(or backward)-spatial-average-covariance matrix based on the correlation vectors generated by the correlation-vector generating unit; a target-count-estimation-matrix generating unit that generates a target-count-estimation matrix based on the pseudo-forward (or backward)-spatial-average-covariance matrix calculated by the pseudo-spatial-average-covariance-matrix calculating unit; and a target-count estimating unit that estimates the target count based on an index defined by using diagonal elements of a diagonal matrix or elements of an upper triangular matrix, as a result of matrix decomposition performed on the target-count-estimation matrix generated by the target-count-estimation-matrix generating unit.

According to another aspect of an embodiment, a detection and ranging method for a detection and ranging device with a transmission sensor array and a reception sensor array that is formed of n ($2 \leq n$) sensor elements, estimating a target count indicating the number of targets based on reflected signals of transmission signals sent from the transmission sensor array and reflected from the targets, and estimating an angle at which each reflected signal comes based on the target count, includes generating correlation vectors based on outputs of the n sensor elements of the reception sensor array; calculating a pseudo-forward(or backward)-spatial-average-covariance matrix based on the generated correlation vectors; calculating a pseudo-backward(or forward)-spatial-average-covariance matrix based on the calculated pseudo-forward(or backward)-spatial-average-covariance matrix; generating, as a target-count-estimation matrix, a product of an output matrix and a Hermitian conjugate of the output matrix, the output matrix being generated by selecting one appropriate matrix or two or more appropriate matrixes for combination from among the calculated pseudo-forward-spatial-average-covariance matrix and the calculated pseudo-backward-spatial-average-covariance matrix; and estimating the target count based on an index defined by using diagonal elements of a diagonal matrix or elements of an upper triangular matrix, as a result of matrix decomposition performed on the generated target-count-estimation matrix.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE PREFERRED EMBODIMENTS

With reference to the attached drawings, embodiments of the detection and ranging device and detection and ranging method according to the present invention are explained in detail below.

Figure 1:
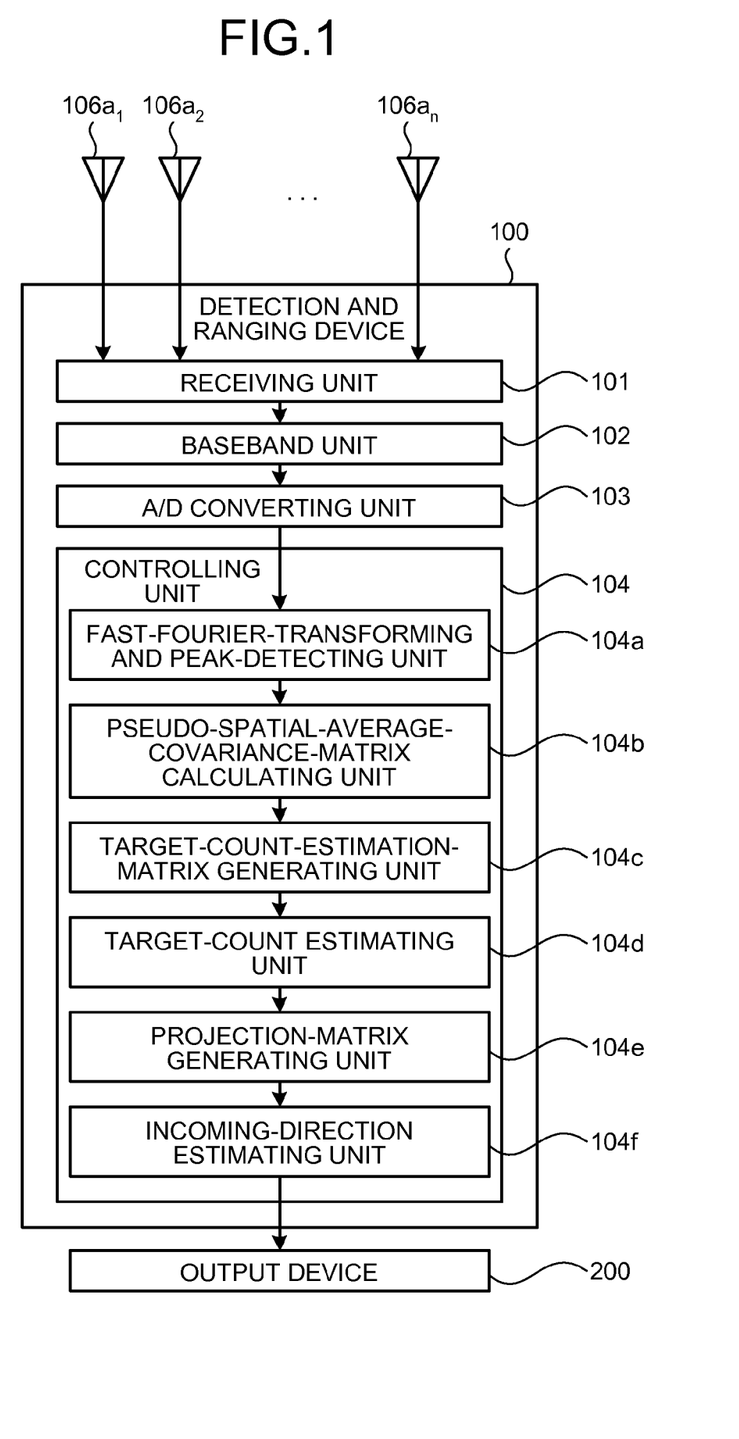
FIG. 1 is a functional block diagram of the configuration of a detection and ranging device according to an embodiment.

First, the configuration of the detection and ranging device according to an embodiment is explained. FIG. 1 is a functional block diagram of the configuration of the detection and ranging device according the embodiment. As depicted in FIG. 1, a detection and ranging device 100 according to the embodiment includes the sensor elements $106a_1$ to $106a_n$ equally spaced apart from each other so that a distance between adjacent sensor elements is d, a receiving unit 101 connected to the sensor elements $106a_1$ to $106a_n$, a baseband unit 102, an analog/digital (A/D) converting unit 103, and a controlling unit 104.

The controlling unit 104 includes a fast-Fourier-transforming and peak-detecting unit 104a, a pseudo-spatial-average-covariance-matrix calculating unit 104b, a target-count-estimation-matrix generating unit 104c, a target-count estimating unit 104d, a projection-matrix generating unit 104e, and an incoming-direction estimating unit 104f.

The receiving unit 101 receives echo signals, which are independent reflected waves reflected from m targets via the sensor elements $106a_1$ to $106a_n$. The echo signals received by the receiving unit 101 are converted to baseband signals by the baseband unit 102, and then are converted to digital signals by the A/D converting unit 103. The digital signals are represented by a matrix V as in the following equation, where $\Delta t$ is a sampling interval and k is the number of samples:

$$V=[V(\Delta t) \ldots V(k\Delta t)] \tag{17}$$

That is, the digital signal V is represented as a complex matrix with n rows and k columns. Here, a signal vector V(t), which is an element of the matrix V at a time t, is as in the following equation:

$$v(t) = \begin{bmatrix} v_1(t) \\ \vdots \\ v_n(t) \end{bmatrix} \tag{18}$$

This digital signal V is input to the fast-Fourier-transforming and peak-detecting unit 104a of the controlling unit 104. The fast-Fourier-transforming and peak-detecting unit 104a performs an fast Fourier transform (FFT) process on the digital signal V for conversion to a complex matrix FFT[V] with n rows and k columns, where $\Delta\omega$ is a fundamental frequency.

$$FFT[V]=[V(\Delta\omega), \ldots, V(k\Delta\omega)] \tag{19}$$

Then, the fast-Fourier-transforming and peak-detecting unit 104a evaluates a power spectrum of, for example, the first row of the signal vector, of FFT[V] for peak detection, and then outputs a signal vector V($\gamma$) at a frequency index $\gamma$ corresponding to the peak position on the frequency axis. V($\gamma$) is defined by the following equation:

$$v(\gamma) = \begin{bmatrix} v_1(\gamma) \\ \vdots \\ v_n(\gamma) \end{bmatrix} \tag{20}$$

This V($\gamma$) is input to the pseudo-spatial-average-covariance-matrix calculating unit 104b. The pseudo-spatial-average-covariance-matrix calculating unit 104b is a processing unit that ultimately finds a pseudo-spatial-average-covariance matrix by using a scheme suggested in an article (IEEE Trans. on Signal Processing, Vol. 52, No. 4, 2004, pp. 876-893) based on Equation 20 above.

Figure 2:
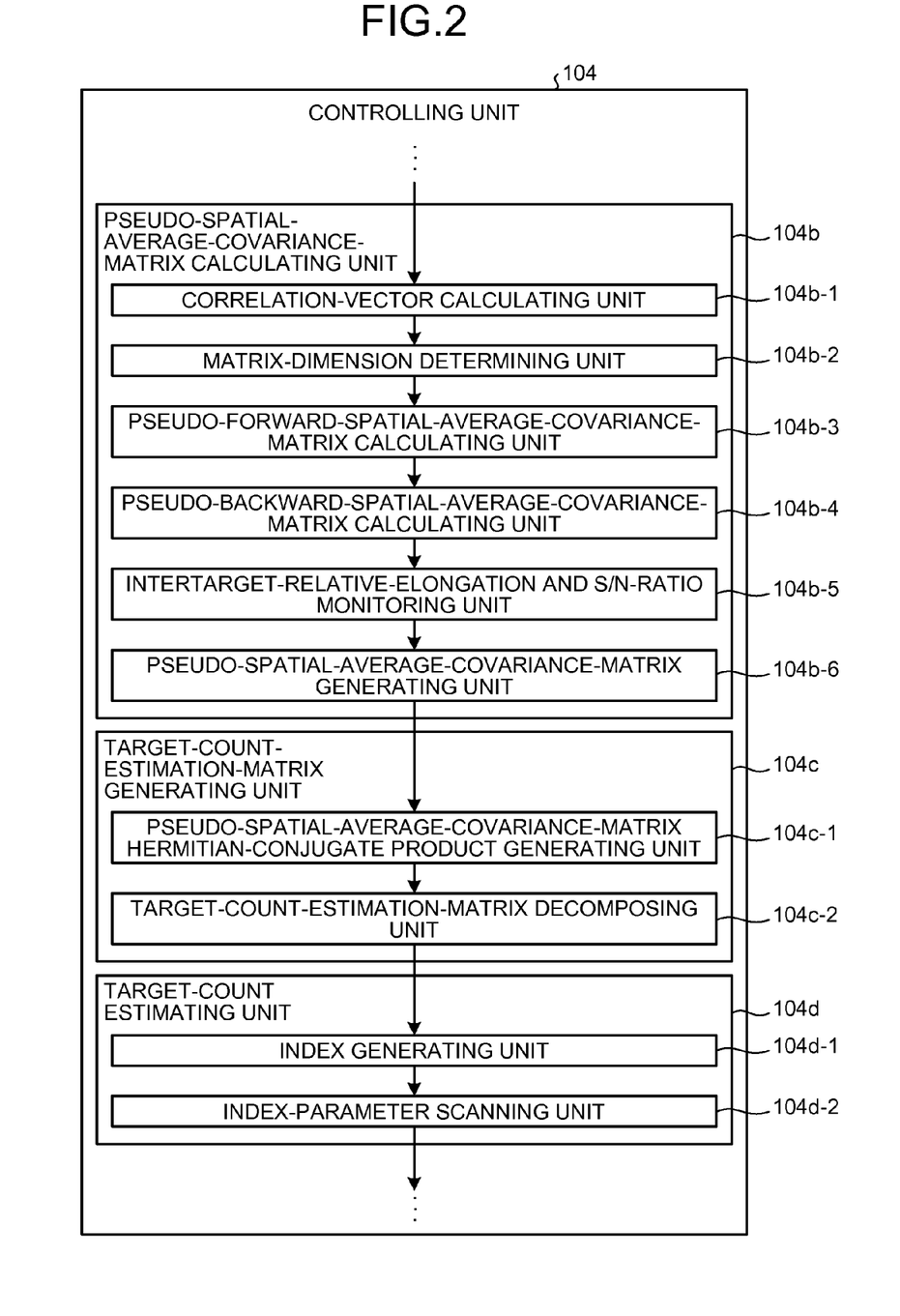
FIG. 2 is a functional block diagram of a detailed configuration of a controlling unit of the detection and ranging device according to the embodiment.

As depicted in FIG. 2, the pseudo-spatial-average-covariance-matrix calculating unit 104b includes a correlation-vector calculating (or generating) unit 104b-1, a matrix-dimension determining unit 104b-2, a pseudo-forward-spatial-average-covariance-matrix calculating unit 104b-3, a pseudo-backward-spatial-average-covariance-matrix calculating unit 104b-4, an intertarget-relative-elongation and S/N-ratio monitoring unit 104b-5, and a pseudo-spatial-average-covariance-matrix generating unit 104b-6.

First, the correlation-vector calculating unit 104b-1 calculates correlation vectors $R_{v1}$ and $R_{v2}$ of the baseband signal by using Equation 21 and 22 below. Note that, as explained above, it is assumed that the baseband signal is converted to an amount in a frequency domain and the position of the signal data on the frequency axis is identified with the index $\gamma$, where $v1^*(\gamma)$ and $vn^*(\gamma)$ represent complex conjugate values (scalars) of elements in the first and n-th rows of the vector V($\gamma$), respectively:

$$R_{v1}=E[V(\gamma)v_n^*(\gamma)] \tag{21}$$

$$R_{v2}=E[V(\gamma)v_1^*(\gamma)] \tag{22}$$

Next, the matrix-dimension determining unit 104b-2 determines in advance a dimension x of the row vectors that configure generalized Hankel matrixes (simply hereinafter, "Hankel matrixes") $R_{f1}$, $R_{f2}$, which will be explained further below, based on the following equation, where [*] is a Gauss' symbol:

$$x=[(n-1)/2] \tag{23}$$

For simplification, "y" defined in the following equation is introduced:

$$y=n-x \tag{24}$$

Then, the pseudo-forward-spatial-average-covariance-matrix calculating unit 104b-3 generates the Hankel matrixes $R_{f1}$, $R_{f2}$, with y rows and x columns based on the following equations, where $R_{f1}$, $R_{f2}$ are matrixes each corresponding to a pseudo covariance matrix component to which forward-spatial-averaging operation is applied:

$$R_{f1} = \begin{bmatrix} R_{v1}^T(1) \\ \vdots \\ R_{v1}^T(y) \end{bmatrix} \tag{25}$$

$$R_{f2} = \begin{bmatrix} R_{v2}^T(2) \\ \vdots \\ R_{v2}^T(y+1) \end{bmatrix} \tag{26}$$

Then, the pseudo-backward-spatial-average-covariance-matrix calculating unit 104b-4 generates $R_{b1}$, $R_{b2}$ from $R_{f2}$, $R_{f1}$, respectively, by using anti-diagonal matrixes J with anti-diagonal elements indicating 1 and other elements indicating 0 as expressed in the following equations (subscript attached to J denotes its order), where $R_{b1}$, $R_{b2}$ may be directly calculated from V(γ) in a manner similar to that for configuring $R_{f1}$, $R_{f2}$ since $R_{b1}$, $R_{b2}$ are matrixes each corresponding to a pseudo covariance matrix component to which backward-spatial-averaging operation is applied, and in Equation 27 and 28 where a numeral superscript "*" provided to $R_{f2}$, $R_{f1}$ represents that a complex conjugate is taken for each element in the matrix:

$$R_{b1} = J_y R_{f2}^* J_x \quad (27)$$

$$R_{b2} = J_y R_{f1}^* J_x \quad (28)$$

When some calculations are performed by noting the following equation, for example, it can be found that the matrix $R_{f1}$ has a form of AZ, that is, $R_{f1} = AZ$:

$$R_{v1}(k) = E\begin{bmatrix} v_k(\gamma)v_n^*(\gamma) \\ \vdots \\ v_{k+x-1}(\gamma)v_n^*(\gamma) \end{bmatrix} \quad (k = 1, 2, \ldots, y) \quad (29)$$

Then, the pseudo-spatial-average-covariance-matrix generating unit 104b-6 arranges four matrixes $R_{f1}$, $R_{f2}$, $R_{b1}$, $R_{b2}$ to generate a matrix R expressed below, where R is called a pseudo-spatial-average-covariance matrix since it has the same information as that of a covariance matrix to which a generic spatial average operation is applied (refer to the Equation 10):

$$R = (R_{f1} R_{f2} R_{b1} R_{b2}) \quad (30)$$

Note that the pseudo-spatial-average-covariance matrix R is not restricted to the one expressed in Equation 30. That is, based on either one or both of a relative elongation assumed between targets and an signal-to-noise (S/N) ratio of a received reflected signal monitored by the intertarget-relative-elongation and S/N-ratio monitoring unit 104b-5, when either one or both of the relative elongation assumed between targets and the S/N ratio of the received reflected signal are equal to or larger than a first threshold, the pseudo-spatial-average-covariance-matrix generating unit 104b-6 may select any one of $R_{f1}$, $R_{f2}$, $R_{b1}$ and $R_{b2}$ and take the selected one as the pseudo-spatial-average-covariance matrix R. For example, when $R_{f1}$ is selected, R may be defined as follows.

$$R = (R_{f1}) \quad (30.1)$$

Alternatively, when either one or both of the relative elongation assumed between targets and the S/N ratio of the received reflected signal monitored by the intertarget-relative-elongation and S/N-ratio monitoring unit 104b-5 are equal to or larger than a second threshold and smaller than the first threshold (where the second threshold ≤ the first threshold), a combination of at least two matrixes selected from $R_{f1}$, $R_{f2}$, $R_{b1}$ and $R_{b2}$ may be taken as the pseudo-spatial-average-covariance matrix R. For example, when $R_{f1}$, $R_{f2}$ and $R_{b1}$ are selected, R may be defined as follows.

$$R = (R_{f1} R_{f2} R_{b1}) \quad (30.2)$$

Still alternatively, when either one or both of the relative elongation assumed between targets and the S/N ratio of the received reflected signal monitored by the intertarget-relative-elongation and S/N-ratio monitoring unit 104b-5 are smaller than the second threshold, all of $R_{f1}$, $R_{f2}$, $R_{b1}$, $R_{b2}$ may be selected to form a combination to generate the pseudo-spatial-average-covariance matrix R expressed in Equation 30 above.

The pseudo-spatial-average-covariance-matrix calculating unit 104b outputs the pseudo-spatial-average-covariance matrix R generated as in the manner explained above to the target-count-estimation-matrix generating unit 104c.

As depicted in FIG. 2, the target-count-estimation-matrix generating unit 104c further includes a pseudo-spatial-average-covariance-matrix Hermitian-conjugate product generating unit 104c-1 and a target-count-estimation-matrix decomposing unit 104c-2.

From the pseudo-spatial-average-covariance matrix R generated by the pseudo-spatial-average-covariance-matrix calculating unit 104b, the pseudo-spatial-average-covariance-matrix Hermitian-conjugate product generating unit 104c-1 once generates a matrix $R^H$ (the Hermitian conjugate of R) and a product of R and $R^H$, that is, $RR^H$ as a target-count-estimation matrix.

Next, the target-count-estimation-matrix decomposing unit 104c-2 performs LU decomposition on $RR^H$ generated by the pseudo-spatial-average-covariance-matrix Hermitian-conjugate product generating unit 104c-1 into a lower triangular matrix L and an upper triangular matrix U as in the following equation:

$$RR^H = LU = \begin{bmatrix} l_{11} & & 0 \\ \vdots & \ddots & \\ l_{y1} & \cdots & l_{yy} \end{bmatrix} \begin{bmatrix} u_{11} & \cdots & u_{1y} \\ & \ddots & \vdots \\ 0 & & u_{yy} \end{bmatrix} \quad (31)$$

The decomposition result of $RR^H$ by the target-count-estimation-matrix decomposing unit 104c-2 as expressed in Equation 31 above is output to the target-count estimating unit 104d.

As depicted in FIG. 2, the target-count estimating unit 104d further includes an index generating unit 104d-1 and an index-parameter scanning unit 104d-2. First, the index generating unit 104d-1 defines in advance an index as expressed below by using elements of a row vector of the upper triangular matrix in Equation 31 above:

$$\rho_\pm(i) = |u_{ii}| \pm \sum_{j=i+1}^{y} |u_{ij}| \quad (32)$$

Of course, ρ+(i) and ρ−(i) are representing the following equations respectively:

$$\rho_+(i) = |u_{ii}| + \sum_{j=i+1}^{y} |u_{ij}| \quad (32.1)$$

$$\rho_-(i) = |u_{ii}| - \sum_{j=i+1}^{y} |u_{ij}| \quad (32.2)$$

Next, the index-parameter scanning unit 104d-2 uses ρ±(i) in Equation 32 to estimate a target count m with p given in the following equation:

$$p = \underset{1 \le i \le y-1}{\mathrm{argmax}}\left[\frac{\rho_+(i)}{\rho_+(i+1)}\right] \quad (33)$$

Note that "arg max[ρ+(i)/ρ+(i+1)]" in Equation 33 represents an operation of scanning a parameter i to find i where "ρ+(i)/ρ+(i+1)" shows the maximum value.

Also, the index-parameter scanning unit 104*d*-2 may use ρ−(i) in Equation 33 to estimate the target count m with p given in the following equation:

$$p = \underset{\substack{1\leq i\leq y,\\ 1\leq j(\neq i)\leq y}}{\operatorname{argmax}}\left[\frac{\rho_-(i)}{\rho_-(j)}\right] \quad (34)$$

Note that "arg max[ρ−(i)/ρ−(j)]" in Equation 34 represents an operation of scanning parameters i and j (where i≠j) to find i where "ρ−(i)/ρ−(j)" shows the maximum value.

In place of the index expressed in Equation 32, an index expressed in the following equation may be used:

$$\rho(i)=|u_i| \quad (35)$$

Note that |*| is a norm of *. For example, if an $L_2$ norm is adopted as $|u_i|$, its specific value is (the square root of) a sum of squares of absolute values of elements $u_{ii}, u_{ii+1}, \ldots, u_{iy}$ in an i-th row of the upper triangular matrix U.

The index-parameter scanning unit 104*d*-2 then uses ρ(i) in Equation 35 to estimate the target count m with p given in the following equation:

$$p = \underset{1\leq i\leq y-1}{\operatorname{argmax}}\left[\frac{\rho(i)}{\rho(i+1)}\right] \quad (36)$$

Note that "arg max[ρ(i)/ρ(i+1)]" in Equation 36 represents an operation of scanning the parameter i to find i where "ρ(i)/ρ(i+1)" is maximum.

Alternatively, the index-parameter scanning unit 104*d*-2 may estimate the target count m with p given in the following equation using ρ(i) in Equation 35:

$$p = \underset{\substack{1\leq i\leq y,\\ 1\leq j(\neq i)\leq y}}{\operatorname{argmax}}\left[\frac{\rho(i)}{\rho(j)}\right] \quad (37)$$

Note that "arg max[ρ(i)/ρ(j)]" in Equation 37 represents an operation of scanning the parameters i and j (where i≠j) to find i where "ρ(i)/ρ(j)" is maximum.

When the S/N ratio of the received reflected signal is relatively good and $RR^H$ represents a positive-definite Hermitian matrix, the target-count-estimation-matrix decomposing unit 104*c*-2 can perform Cholesky decomposition with $RR^H=LL^H$, and can define an index ρ± or ρ similar to those explained above for the upper triangular matrix $L^H$ to estimate the target count. Cholesky decomposition is a scheme of decomposing a positive-definite Hermitian matrix into a product of a lower triangular matrix L and its Hermitian conjugate matrix $L^H$. Alternatively, the target-count-estimation-matrix decomposing unit 104*c*-2 may use another matrix decomposing scheme, such as LDM decomposition, with a lower calculation load for decomposing $RR^H$. In this case, by using a diagonal element of a diagonal matrix D, an index similar to that in Equation 32 or 35 is defined. LDM decomposition is a scheme in which, when a matrix A can be diagonalized with $D=LAL^{-1}$ for an appropriate nonsingular matrix L, $M=(L^{-1})^T$ is taken, thereby taking A as a product of three matrixes, that is, the lower triangular matrix L, the diagonal matrix D, and the upper triangular matrix M, for decomposition into A=LDM.

When either one or both of the relative elongation assumed between targets and the S/N ratio of the received reflected signal are equal to or larger than a predetermined threshold and there is a high possibility that $RR^H$ becomes a positive-definite Hermitian matrix, the target-count-estimation-matrix decomposing unit 104*c*-2 may first perform Cholesky decomposition on matrix $RR^H$. Cholesky decomposition is a scheme with the least amount of calculation among the decomposition schemes including LU decomposition and LDM decomposition.

When a difference between the estimation result of the target count using Cholesky decomposition and the previous estimation result is significant (for example, the target count is doubled within a short period of time) or when Cholesky decomposition fails, the target-count-estimation-matrix generating unit 104*c* may next perform LU decomposition (or LDM decomposition) on $RR^H$.

Meanwhile, it has been known that when a process of setting a matrix A as $A_o=A$, performing the following calculation for $z=0, 1, \ldots$, that is, LU decomposition as $A_z=L_zU_z$, and then using this to set $A_{z+1}=U_zL_z$ is repeated, $A_z$ eventually converges to an upper triangular matrix having eigenvalues (of the matrix A) in diagonal elements. That is, the upper triangular matrix U obtained through simple LU decomposition of $RR^H$ represents primary approximation of above mentioned $A_z$-procedure.

Therefore, in principle, with the diagonal elements of the upper triangular matrix U being taken as an index, the target count can be estimated. However, in view of improvement in robustness under low S/N-ratio conditions, the ratio of magnitude of the row vectors is desirably taken as an index for estimating the target count. For this reason, the target count m is estimated based on Equations 33, 34, 36, and 37.

Furthermore, among the indexes defined in Equation 32, those obtained by subtracting a sum of magnitudes of the remaining elements in the relevant row vector from the diagonal elements in that row vector are indexes defined with the Gershgorin's theorem in mind.

That is, according to the Gershgorin's theorem, every eigenvalue of a matrix lies within a circle centered at an i-th diagonal element with a radius defined by the sum of magnitudes of the remaining elements in the relevant row vector. That is, an eigenvalue λ of a matrix lies within a range represented by the left side of the following inequality for $i=1, \ldots, y$:

$$|\lambda - u_{ii}| \leq \sum_{j=i+1}^{y} |u_{ij}| \quad (38)$$

That is, with evaluation based on Equation 33, 34, 36, or 37, the number of signals can be estimated.

In this manner, the target count can be estimated with a less amount of calculation, compared with the conventional scheme. Therefore, the above scheme can be applied to vehicle-mounted radars with lower CPU performance and mobile devices required to quickly update detection and ranging information.

Referring back to FIG. 1, the projection-matrix generating unit 104*e* finds, for example, a projection matrix Q and a scaling matrix S from the matrix R in Equation 30 according to the target count m estimated by the target-count estimating unit 104*d*. The projection-matrix generating unit 104*e* divides the matrix R into a matrix $R_1$ with x rows and 4x columns and a matrix $R_2$ with (y−x) rows and 4x columns (where x and y are numbers defined in Equations 23 and 24, respectively, and coefficient 4 of 4x shows how many matrixes among $R_{f1}, R_{f2}$, $R_{b1}$ and $R_{b2}$ are used to configure the matrix R), and uses Equations 39.1 and 39.2 to calculate Q and S, respectively:

$$Q = \begin{bmatrix} (R_1 R_1^H)^{-1} R_1 R_2^H \\ -I_{y-x} \end{bmatrix} \quad (39.1)$$

$$S = R_2 R_2^H - R_2 R_1^H (R_1 R_1^H)^{-1} R_1 R_2^H \quad (39.2)$$

Here, $I_{y-x}$ in Equation 39.1 is a (y-x)-order unit matrix. $R_1^H$ and $R_2^H$ are Hermitian conjugates of $R_1$ and $R_2$, respectively, and $(R_1 R_1^H)^{-1}$ is an inverse matrix of $(R_1 R_1^H)$.

The relation between the target-count-estimation matrix $RR^H$ and the matrixes Q and S are as follows, where an inverse-matrix theorem regarding submatrix is used for a transition from Equation 40.1 to Equation 40.2:

$$(RR^H)^{-1} = \left[ \begin{pmatrix} R_1 \\ R_2 \end{pmatrix} (R_1^H \ R_2^H) \right]^{-1} \quad (40.1)$$

$$= \begin{bmatrix} R_1 R_1^H & R_1 R_2^H \\ R_2 R_1^H & R_2 R_2^H \end{bmatrix}^{-1}$$

$$\equiv \begin{bmatrix} A & B \\ B^H & D \end{bmatrix}^{-1}$$

$$= \begin{bmatrix} A^{-1} + A^{-1} B (D - B^H A^{-1} B)^{-1} & -A^{-1} B (D - B^H A^{-1} B)^{-1} \\ -(D - B^H A^{-1} B)^{-1} (A^{-1} B)^H & (D - B^H A^{-1} B)^{-1} \end{bmatrix} \quad (40.2)$$

$$= \begin{bmatrix} A^{-1} & 0 \\ 0 & 0 \end{bmatrix} +$$

$$\begin{bmatrix} A^{-1} B (D - B^H A^{-1} B)^{-1} (A^{-1} B)^H & -A^{-1} B (D - B^H A^{-1} B)^{-1} \\ -(D - B^H A^{-1} B)^{-1} (A^{-1} B)^H & (D - B^H A^{-1} B)^{-1} \end{bmatrix}$$

$$= \begin{bmatrix} A^{-1} & 0 \\ 0 & 0 \end{bmatrix} +$$

$$\begin{bmatrix} A^{-1} B (D - B^H A^{-1} B)^{-1} (A^{-1} B)^H & A^{-1} B (D - B^H A^{-1} B)^{-1} (-I)^H \\ -I (D - B^H A^{-1} B)^{-1} (A^{-1} B)^H & -I (D - B^H A^{-1} B)^{-1} (-I)^H \end{bmatrix}$$

$$= \begin{bmatrix} A^{-1} & 0 \\ 0 & 0 \end{bmatrix} + \begin{bmatrix} A^{-1} B \\ -I \end{bmatrix} (D - B^H A^{-1} B)^{-1} \left[ (A^{-1} B)^H \ (-I)^H \right] \quad (40)$$

$$= \begin{bmatrix} A^{-1} & 0 \\ 0 & 0 \end{bmatrix} + Q S^{-1} Q^H$$

The incoming-direction estimating unit 104f generates from the matrix Q generated by the projection-matrix generating unit 104e a matrix $Q(Q^H Q)^{-1} Q^H$ (where $Q^H$ represents a Hermitian conjugate of Q). Then, with the PROPAGATOR scheme using $Q(Q^H Q)^{-1} Q^H$ (refer to IEEE Trans. on Signal Processing, Vol. 39, No. 3, 1991, pp. 746-749), an angular vector $a(\theta)$ is scanned with $\theta$ being taken as a parameter, thereby finding the parameter $\theta$ when a peak appears in Equation 41. With this, an angle $\theta_\beta$ for each target is estimated.

$$P_{PROPAGATOR}(\theta) = \frac{a^H(\theta) a(\theta)}{a^H(\theta) [Q(Q^H Q)^{-1} Q^H] a(\theta)} \quad (41)$$

Alternatively, Equation 42 below may be used in place of Equation 41. In this case, the incoming-direction estimating unit 104f generates from the matrixes Q and S generated by the projection-matrix generating unit 104e a matrix $QS^{-1} Q^H$ (where $S^{-1}$ represents an inverse matrix of S). Then, by using $QS^{-1} Q^H$, the angular vector $a(\theta)$ is scanned with $\theta$ being taken as a parameter, thereby finding the parameter $\theta$ when a peak appears in Equation 42. With this, the angle $\theta_\beta$ for each target is estimated.

$$P(\theta) = \frac{a^H(\theta) a(\theta)}{a^H(\theta) Q S^{-1} Q^H a(\theta)} \quad (42)$$

The direction $\theta_\beta$ of the target $\beta$ can be estimated not restrictively with Equation 41 or 42, but also with any scheme as long as the scheme is to scan angular information included in the matrix. For example, Equation 14 may be used.

The incoming-direction estimating unit 104f outputs the direction $\theta_\beta$ of each of m targets $\beta$ estimated in the manner as explained above to an output device 200.

Figure 3:
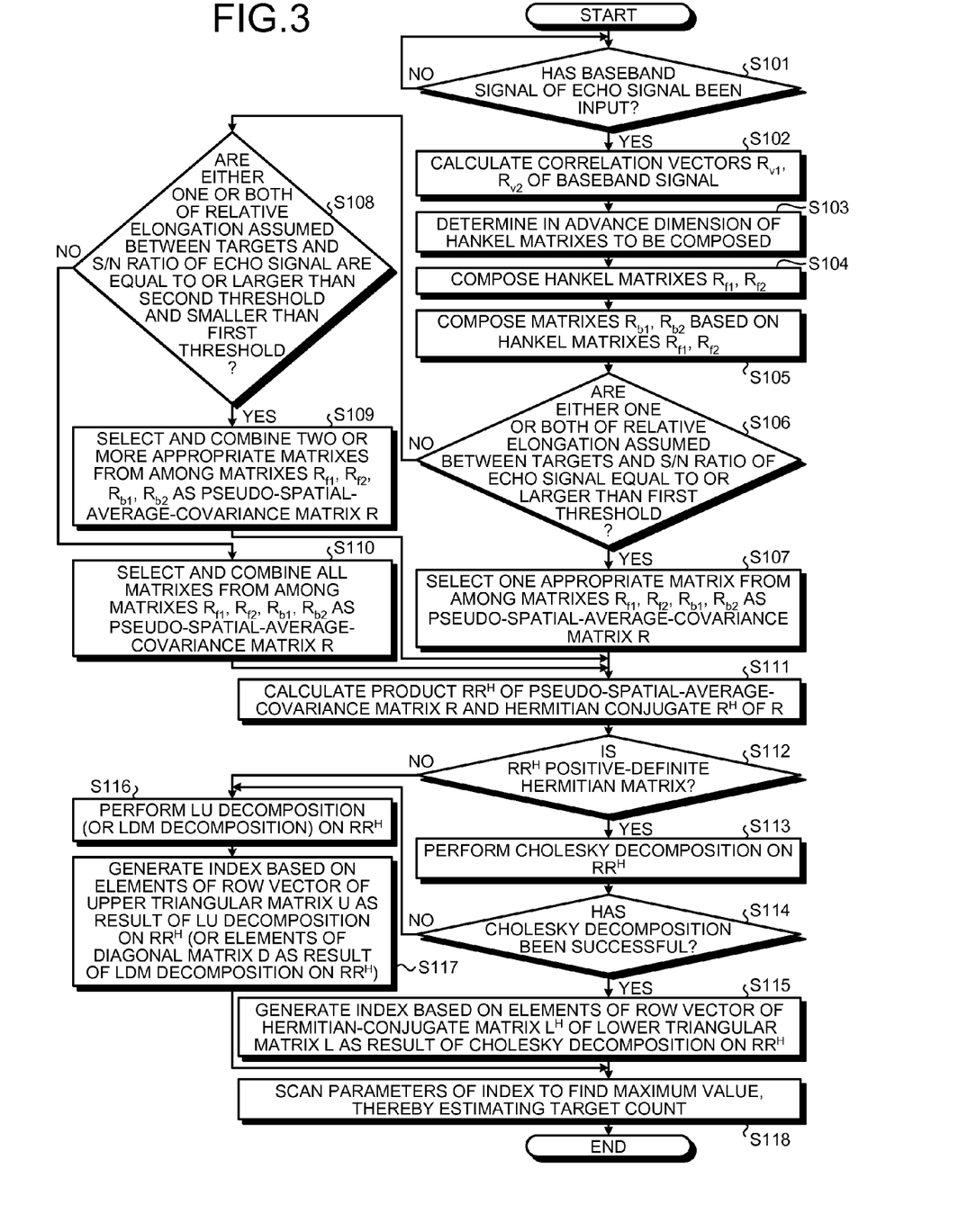
FIG. 3 is a flowchart of a target-count estimating process according to an embodiment.

Next, a target-count estimating process according to the embodiment is explained. FIG. 3 is a flowchart of the target-count estimating process according to the embodiment. As depicted in FIG. 3, the fast-Fourier-transforming and peak-detecting unit 104a determines whether a baseband signal of an echo signal from a target has been input (Step S101).

If it is determined that a baseband signal of an echo signal from a target has been input (Yes at Step S101), the procedure goes to Step S102 of a calculation process in the pseudo-spatial-average-covariance-matrix calculating unit 104b. If it is determined that a baseband signal of an echo signal from a target has not been input (No at Step S101), Step S101 is repeated (specifically, the next peak position y is searched for on a frequency index and, if no peak is detected anywhere in measurement data for one set, data measurement is again performed).

Then, at Step S102, the correlation-vector calculating unit 104*b*-1 calculates correlation vectors $R_{v1}, R_{v2}$ of the baseband signal. Then, the matrix-dimension determining unit 104*b*-2 determines in advance a dimension of Hankel matrixes to be composed (Step S103).

Then, the pseudo-forward-spatial-average-covariance-matrix calculating unit 104*b*-3 composes Hankel matrixes $R_{f1}, R_{f2}$ (Step S104). Then, the pseudo-backward-spatial-average-covariance-matrix calculating unit 104*b*-4 composes matrixes $R_{b1}$ and $R_{b2}$ based on Hankel matrixes $R_{f2}, R_{f1}$ composed by the pseudo-forward-spatial-average-covariance-matrix calculating unit 104*b*-3 (Step S105).

Then, the intertarget-relative-elongation and S/N-ratio monitoring unit 104*b*-5 determines whether either one or both of a relative elongation assumed between targets and an S/N ratio of the echo signal are equal to or larger than the first threshold (Step S106). If it is determined that either one or both of the relative elongation assumed between targets and the S/N ratio of the echo signal are equal to or larger than the first threshold (Yes at Step S106), the procedure goes to Step S107. If it is not determined that either one or both of the relative elongation assumed between targets and the S/N ratio of the echo signal are equal to or larger than the first threshold (No at Step S106), the procedure goes to Step S108.

At Step S107, the pseudo-spatial-average-covariance-matrix generating unit 104*b*-6 selects one appropriate matrix from among the matrixes $R_{f1}, R_{f2}, R_{b1}$ and $R_{b2}$ as the pseudo-spatial-average-covariance matrix R. Upon completion of this process, the procedure goes to Step S111.

On the other hand, at Step S108, the intertarget-relative-elongation and S/N-ratio monitoring unit 104*b*-5 determines whether either one or both of the relative elongation assumed between targets and the S/N ratio of the echo signal are equal to or larger than the second threshold and smaller than the first threshold. If it is determined that either one or both of the relative elongation assumed between targets and the S/N ratio of the echo signal are equal to or larger than the second threshold and smaller than the first threshold (Yes at Step S108), the procedure goes to Step S109. If it is not determined that either one or both of the relative elongation assumed between targets and the S/N ratio of the echo signal are equal to or larger than the second threshold and smaller than the first threshold (No at Step S108), the procedure goes to Step S110.

At Step S109, the pseudo-spatial-average-covariance-matrix generating unit 104*b*-6 selects and combines two or more appropriate matrixes from among the matrixes $R_{f1}, R_{f2}, R_{b1}$ and $R_{b2}$ as the pseudo-spatial-average-covariance matrix R. Upon completion of this process, the procedure goes to Step S111.

On the other hand, at Step S110, the pseudo-spatial-average-covariance-matrix generating unit 104*b*-6 selects and combines all matrixes from among the matrixes $R_{f1}, R_{f2}, R_{b1}, R_{b2}$ as the pseudo-spatial-average-covariance matrix R. Upon completion of this process, the procedure goes to Step S111.

At Step S111, the pseudo-spatial-average-covariance-matrix Hermitian-conjugate product generating unit 104*c*-1 of the target-count-estimation-matrix generating unit 104*c* calculates the product $RR^H$ of the pseudo-spatial-average-covariance matrix R and a matrix $R^H$; the Hermitian conjugate of R.

Then, the target-count-estimation-matrix decomposing unit 104*c*-2 determines whether $RR^H$ is a positive-definite Hermitian matrix (Step S112). If it is determined that $RR^H$ is a positive-definite Hermitian matrix (Yes at Step S112), the procedure goes to Step S113. If it is not determined that $RR^H$ is a positive-definite Hermitian matrix (No at Step S112), the procedure goes to Step S116.

At Step S113, the target-count-estimation-matrix decomposing unit 104*c*-2 performs Cholesky decomposition on $RR^H$. Then, the target-count-estimation-matrix decomposing unit 104*c*-2 determines whether Cholesky decomposition of Step S113 has been successful (Step S114). If it is determined that Cholesky decomposition has been successful (Yes at Step S114), the procedure goes to Step S115. If it is not determined that Cholesky decomposition has been successful (No at Step S114), the procedure goes to Step S116.

At Step S115, the index generating unit 104*d*-1 of the target-count estimating unit 104*d* generates an index based on the elements of the row vector of the Hermitian-conjugate matrix $L^H$ of the lower triangular matrix L as a result of Cholesky decomposition on $RR^H$. Upon completion of this process, the procedure goes to Step S118.

On the other hand, at Step S116, the target-count-estimation matrix decomposing unit 104*c*-2 performs LU decomposition (or LDM decomposition) on $RR^H$. Then, the index generating unit 104*d*-1 of the target-count estimating unit 104*d* generates an index based on the elements of the row vector of the upper triangular matrix U as a result of LU decomposition on $RR^H$ (or the elements of the diagonal matrix D as a result of LDM decomposition on $RR^H$) (Step S117). Upon completion of this process, the procedure goes to Step S118.

At Step S118, the index-parameter scanning unit 104*d*-2 scans parameters of the index to find a maximum value, thereby estimating the target count m. Here, the relative elongation assumed between targets referred to at, for example, Step S106, has a value estimated in a measurement period one or several sections before the current measurement data or a value estimated by applying a simpler angle estimating process (for example, FFT beam former) to the current measurement data. Also, a determination as to whether a decomposition calculation has been successful for use at, for example, Step S114, can be made with any appropriate known technique in consideration of calculation load, such as by recomposing the decomposition result to take a difference between the matrixes before decomposition and determining whether the magnitude of the difference is on the order of the machine epsilon.

Figure 4:
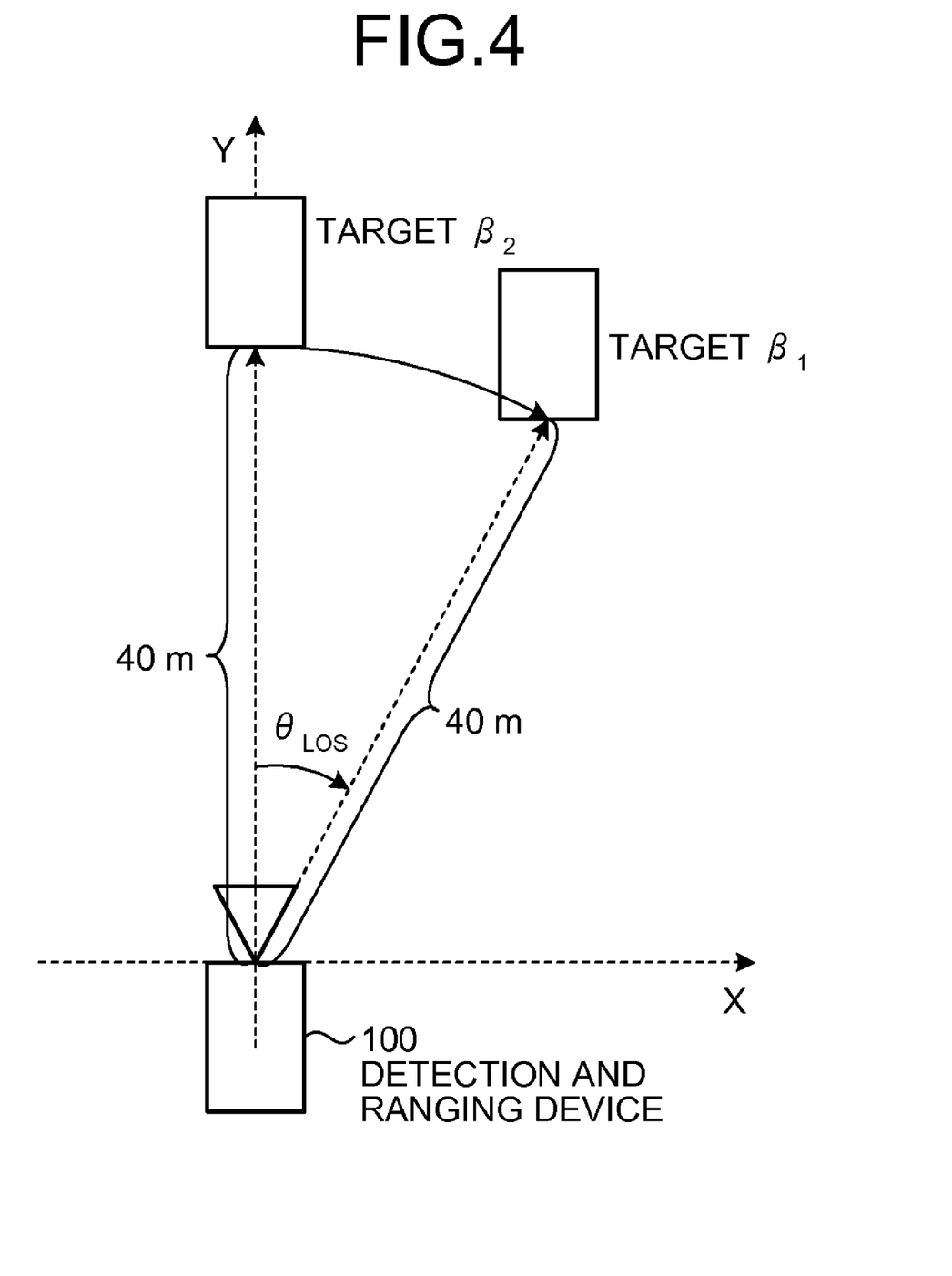
FIG. 4 is a drawing of a precondition for a simulation of estimating a target count.
Figure 5A:
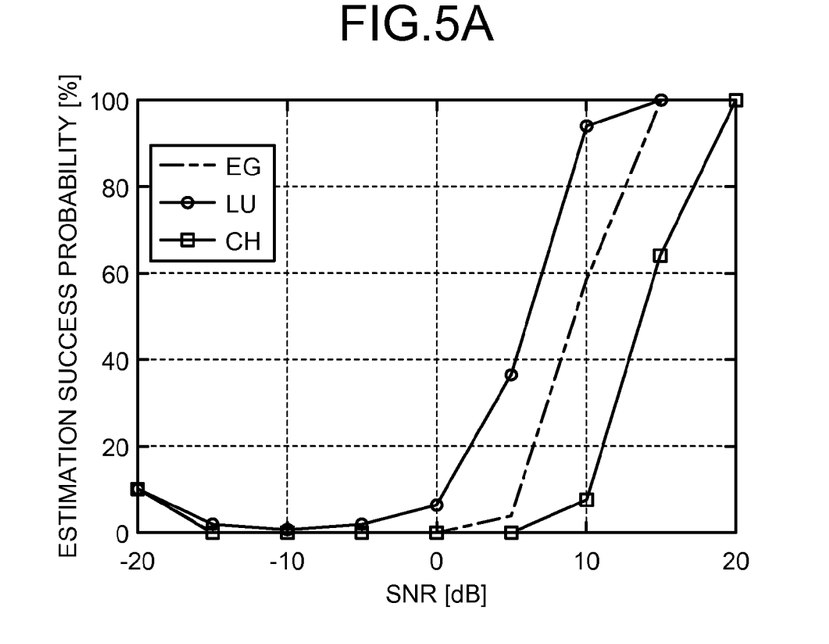
FIG. 5A is a drawing of results of a simulation of estimating a target count (when a relative elongation $\theta_{Los}=1°$)
Figure 5B:
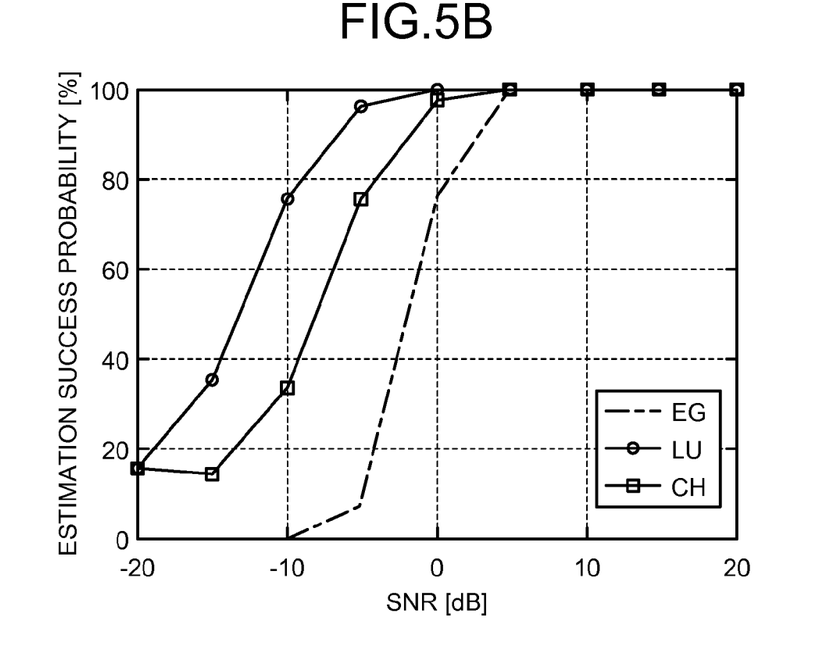
FIG. 5B is a drawing of results of a simulation of estimating a target count (when a relative elongation $\theta_{Los}=2°$)

Next, simulation results using the detection and ranging device 100 according to the embodiment are explained. FIG. 4 is a drawing of a precondition for a simulation of estimating the target count. FIGS. 5A and 5B are drawings of results of simulations of estimating the target count.

As depicted in FIG. 4, it is assumed that two targets $\beta_1$ and $\beta_2$ are positioned at a relative distance of 40 meters and a relative elongation (relative elongation between the targets, $\theta_{Los}$) of 1° or 2° with respect to the detection and ranging device 100, where a relative velocity between each target and the detection and ranging device 100 is assumed to be 0 kilometer per hour.

FIG. 5A depicts a case when the relative elongation is 1°, whilst FIG. 5B depicts the case when the relative elongation is 2°. In both drawings, success probabilities in correct target-count estimation are depicted for the schemes in the embodiment of the present invention and a conventional scheme, with observations being made by a Frequency Modulated Continuous Wave (FMCW) radar with a sensor array including nine sensors. In each drawing, the vertical axis represents an estimation success probability, whilst the horizontal axis represents an S/N ratio. Trials were made 1000 times for each scheme and each point in S/N ratio.

FIGS. 5A and 5B depict estimation success probabilities for an EG decomposing scheme as a convention scheme, and an LU decomposing scheme and a CH decomposing scheme explained in the embodiment. In the EG decomposing scheme, an eigenvalue decomposition is performed on the matrix in Equation 10 and an evaluation is performed with AIC in Equation 15. In the LU decomposing scheme, LU decomposition is performed on $RR^H$ as expressed in Equation 31, and an evaluation is performed with the index in any of Equations 32 to 37, and Equation 33 (and thus 32) was exemplarily used in FIGS. 5A and 5B. In the CH decomposing scheme, $RR^H$ is generated from R found in Equation 30, then Cholesky decomposition on $RR^H$ is performed, and the upper triangular element is evaluated with the index in any of Equations 32 to 37, and Equation 33 (and thus 32) was exemplarily used in FIGS. 5A and 5B.

As depicted in FIG. 5A representing the case of $\theta_{Los}=1°$, it is more difficult to estimate the target count as the relative elongation between targets is smaller. Nevertheless, the LU decomposing scheme achieves higher estimation success probabilities than that of the EG decomposing scheme. Also, as depicted in FIG. 5B representing the case of $\theta_{Los}=2°$, as the relative elongation between targets is larger, advantages of the LU decomposing scheme and the CH decomposing scheme over the EG decomposing scheme is not changed, but an estimation from a lower S/N ratio becomes successful.

Figure 6:
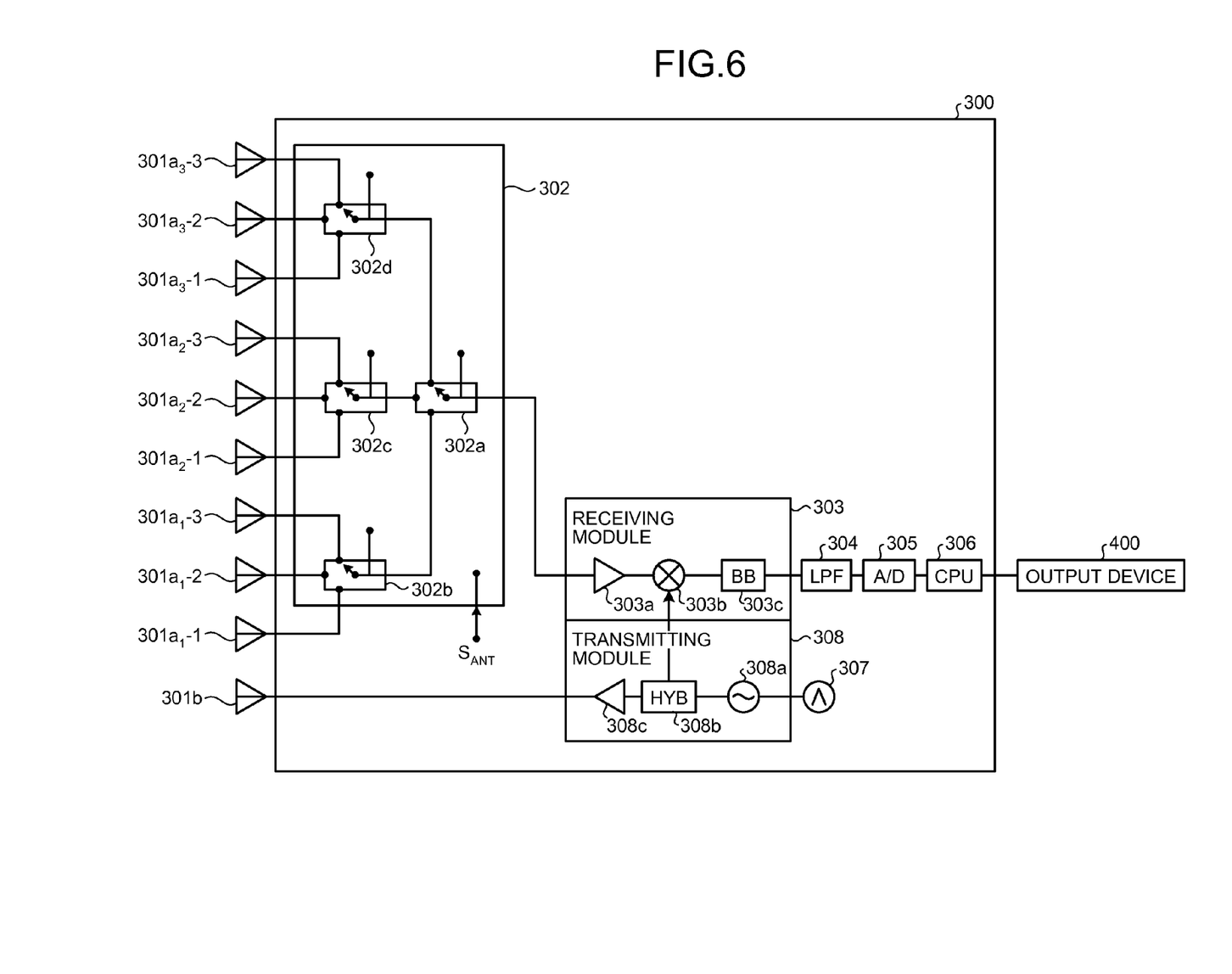
FIG. 6 is a drawing of an example when the detection and ranging device according to the embodiment is applied to an FMCW radar device.

Next, an example of the case is explained where the detection and ranging device according to the present embodiment is applied to an FMCW radar device. FIG. 6 is a drawing of an example when the detection and ranging device 100 according to the embodiment is applied to an FMCW radar device 300.

An FMCW radar device 300 includes a transmission antenna 301b for emitting a transmission wave, a reception array antenna, a switch box 302, a receiving module 303, a low-pass filter 304, an A/D converter 305, a CPU 306, a baseband oscillator 307, and a transmitting module 308. In this example, the reception array antenna includes nine antenna elements, that is, antenna elements $301a_1$-1 to $301a_1$-3, antenna elements $301a_2$-1 to $301a_2$-3, and antenna elements $301a_3$-1 to $301a_3$-3.

The switch box 302 includes a switch 302a, a switch 302b, a switch 302c, and a switch 302d. The switch 302b is a switch that makes a switch for selecting any one of the antenna elements $301a_1$-1 to $301a_1$-3.

Similarly, the switch 302c is a switch that makes a switch for selecting any one of the antenna elements $301a_2$-1 to $301a_2$-3, and the switch 302d is a switch that makes a switch for selecting any one of the antenna elements $301a_3$-1 to $301a_3$-3. The switch 302a is a switch that makes a switch for selecting any one of the outputs from the switches 302b, 302c, and 302d.

The receiving module 303 includes an amplifying unit 303a that amplifies an radio frequency (RF) reception signal output from the switch box 302, an RF MIXER 303b that mixes a system reference signal supplied from the transmitting module 308 and an output signal from the amplifying unit 303a for conversion to a baseband signal, and a baseband unit 303c including an amplifier. An output signal from the baseband unit 303c has an unwanted band signal component cut by the low-pass filter (LPF) 304, and is then converted to a digital signal by the A/D converter 305. The CPU 306 performs a target-count estimating process, an incoming-direction estimating process, and other processes on the digital signal, and then sends the process result to an output device 400.

The baseband oscillator 307 supplies a periodic signal, such as a triangular wave, as a modulating input signal to an RF voltage controlled oscillator (VCO) 308a of the transmitting module 308 to generate a frequency-modulated system reference signal. An output signal from the RF VCO 308a is branched by a hybrid (HYB) 308b into a signal supplied to the RF MIXER 303b and a signal power-amplified by an amplifying unit 308c and then emitted into space from the transmission antenna 301b as a transmission wave.

According to the embodiments explained above, noise components included in the pseudo-spatial-average-covariance matrix are only mutual correlation values of noise received by each sensor configuring the array. In other words, unlike the covariance matrix for use in normal array signal processing, the pseudo-spatial-average-covariance matrix hardly includes autocorrelation values of noise. As a result, even in a situation with a poor S/N ratio, the target number can be correctly estimated.

Furthermore, the target-count-estimation matrix $RR^H$ is generated from the pseudo-spatial-average-covariance matrix R and is then subjected to LU decomposition. With this, compared with the conventional scheme using eigenvalue decomposition, at least a two-fold increase in computation velocity can be achieved.

Therefore, in the detection and ranging device according to the embodiments, the load on signal-processing components, such as a CPU, is small and the device can be manufactured at low cost, compared with the conventional detection and ranging device. Also, target angle estimation, which is an essential function of the detection and ranging device, can be performed with high accuracy.

The present embodiments focus on determining the number of targets with a temporally-unstable reflection characteristic by using a low-speed CPU under a complex propagation environment. Therefore, a target-count-estimation matrix is generated from the pseudo-spatial-average-covariance matrix, LU decomposition or Cholesky decomposition is performed on the generated matrix, and then the amount calculated from the elements of the upper triangular matrix U is substituted into the predefined index, thereby achieving more rapid estimation of the number of incoming signals.

In the foregoing, while the embodiments of the present invention have been explained, the present invention is not meant to be restricted to these, and can be implemented with further various different embodiments within the range of the technical idea recited in the claims. Also, the effects described in the embodiments are not meant to be restrictive.

Furthermore, among the processes explained in the embodiments above, all or part of the processes explained as being automatically performed may be manually performed through an operator's operation via an input device separately provided, or all or part of the processes explained as being manually performed may be automatically performed through a known method. In addition, the process procedure, the control procedure, specific names, and information including various data and parameters can be arbitrarily changed unless otherwise specified.

Still further, each component of the depicted detection and ranging device is conceptual in function, and is not necessarily physically configured as depicted. That is, the specific patterns of distribution and unification of the components are not meant to be restricted to those depicted in the drawings. All or part of the components can be functionally or physically distributed or unified in arbitrary units according to various loads and the state of use.

Still further, all or arbitrary part of the process function performed in each component can be achieved by a central processing unit (CPU) (or a microcomputer, such as micro processing unit (MPU) or micro controller unit (MCU)) and a program analyzed and executed on that CPU (or microcomputer, such as MPU or MCU), or can be achieved as hardware with a wired logic.

In the disclosed detection and ranging device and detection and ranging method, any one of Cholesky decomposition, LU decomposition, and LDM decomposition, which have a small amount of calculation, is performed on the target-count-estimation matrix, and the target count is estimated based on an index defined by using the elements of the upper triangular matrix or the diagonal elements of the diagonal matrix as a result of this matrix decomposition. With this, an effect can be achieved such that the target-count estimating process can be performed at high speed with high accuracy, can be simplified in algorithm, and can be made compact, and, in turn, implementation of a target-count estimating process logic can be made compact in both hardware and software.

Also, in the disclosed detection and ranging device and detection and ranging method, one appropriate matrix is selected or two or more appropriate matrixes are selected and combined from among the pseudo-forward-spatial-average-covariance matrix and the pseudo-backward-spatial-average-covariance matrix to generate a target-count-estimation matrix. With this, an effect can be achieved such that the size of the target-count-estimation matrix can be reduced according to the situation, thereby increasing the speed of the target-count estimating process.

Furthermore, in the disclosed detection and ranging device and detection and ranging method, according to either one or both of the relative elongation assumed between the targets and the S/N ratio of the reflected signal, one appropriate matrix is selected or two or more appropriate matrixes are selected and combined from among the pseudo-forward-spatial-average-covariance matrix and the pseudo-backward-spatial-average-covariance matrix to generate a target-count-estimation matrix. With this, an effect can be achieved such that the size of the target-count-estimation matrix can be reduced according to either one or both of the relative elongation assumed between the targets and the S/N ratio of the reflected signal, thereby increasing the speed of the target-count estimating process.

Still further, in the disclosed detection and ranging device and detection and ranging method, an output matrix is generated by selecting one appropriate matrix or two or more appropriate matrixes for combination from among the pseudo-forward-spatial-average-covariance matrix and the pseudo-backward-spatial-average-covariance matrix according to either one or both of the relative elongation assumed between the targets and the S/N ratio of the reflected signal. Then, a product of the output matrix and a Hermitian conjugate of the output matrix is generated as the target-count-estimation matrix. Then, the target count is estimated based on an index defined by using the row-vector elements of the upper triangular matrix as a result of Cholesky decomposition, LU decomposition, or LDM decomposition on the target-count-estimation matrix. Also, the target count may be estimated based on an index defined by using the diagonal elements of the diagonal matrix as a result of LDM decomposition on the target-count-estimation matrix. With this, an effect can be achieved such that the target-count estimating process can be performed at high speed by using a scheme with a smaller amount of calculation according to either one or both of the relative elongation assumed between the targets and the S/N ratio of the reflected signal.

Still further, in the disclosed detection and ranging device and detection and ranging method, any one decomposition scheme is selected from among Cholesky decomposition, LU decomposition, and LDM decomposition according to either one or both of the relative elongation assumed between the targets and the S/N ratio of the reflected signal, and then the selected scheme is performed on the target-count-estimation matrix to estimate the target count. When the estimation of the target count is not normally completed, another decomposition scheme is selected to again estimate the target count. With this, an effect can be achieved such that the target-count estimating process can be efficiently performed at high speed by using a scheme with a smaller amount of calculation according to either one or both of the relative elongation assumed between the targets and the S/N ratio of the reflected signal and, when the estimation of the target count is not normally completed, another decomposition scheme is selected to again performed the target-count estimating process, thereby allowing the target-count estimating process to be normally completed more reliably.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A detection and ranging device with a transmission sensor array and a reception sensor array that is formed of n ($2 \leq n$) sensor elements, estimating a target count indicating the number of targets based on reflected signals of transmission signals sent from the transmission sensor array and reflected from the targets, and estimating an angle at which each reflected signal comes based on the target count, the detection and ranging device comprising:

a correlation-vector generating unit that generates correlation vectors based on outputs of the n sensor elements of the reception sensor array;

a pseudo-spatial-average-covariance-matrix calculating unit that calculates a pseudo-forward-spatial-average-covariance matrix based on the correlation vectors generated by the correlation-vector generating unit;

a target-count-estimation-matrix generating unit that generates a target-count-estimation matrix based on the pseudo-forward-spatial-average-covariance matrix calculated by the pseudo-spatial-average-covariance-matrix calculating unit; and a target-count estimating unit that estimates the target count based on an index defined by using diagonal elements of a diagonal matrix or elements of an upper triangular matrix, as a result of matrix decomposition performed on the target-count-estimation matrix generated by the target-count-estimation-matrix generating unit.

2. The detection and ranging device according to claim 1, wherein the pseudo-spatial-average-covariance-matrix calculating unit generates a pseudo-backward-spatial-average-covariance matrix based on the correlation vectors generated by the correlation-vector generating unit and the pseudo-forward-spatial-average-covariance matrix calculated by the pseudo-spatial-average-covariance-matrix calculating unit, and the target-count-estimation-matrix generating unit generates the target-count-estimation matrix based on either one or both of the pseudo-forward-spatial-average-covariance matrix calculated by the pseudo-spatial-average-covariance-matrix calculating unit and the pseudo-backward-spatial-average-covariance matrix calculated by the pseudo-spatial-average-covariance-matrix calculating unit.

3. The detection and ranging device according to claim 2, further comprising a monitoring unit that monitors either one or both of a relative elongation assumed between the targets and an S/N ratio of the reflected signal, wherein
the target-count-estimation-matrix generating unit generates the target-count-estimation matrix by selecting one appropriate matrix or two or more appropriate matrixes for combination from among the pseudo-forward-spatial-average-covariance matrixes and the pseudo-backward-spatial-average-covariance matrixes according to either one or both of the relative elongation assumed between the targets and the S/N ratio of the reflected signal monitored by the monitoring unit.

4. The detection and ranging device according to claim 3, wherein
the target-count-estimation-matrix generating unit generates, as the target-count-estimation matrix, a product of an output matrix and a Hermitian conjugate of the output matrix, the output matrix being generated by selecting one appropriate matrix or two or more appropriate matrixes for combination from among the pseudo-forward-spatial-average-covariance matrixes and the pseudo-backward-spatial-average-covariance matrixes according to either one or both of the relative elongation assumed between the targets and the S/N ratio of the reflected signal monitored by the monitoring unit, and performs LU decomposition on the target-count-estimation matrix, and
the target-count estimating unit estimates the target count based on an index defined by using elements of an upper triangular matrix obtained as a result of the LU decomposition.

5. The detection and ranging device according to claim 3, wherein
the target-count-estimation-matrix generating unit generates, as the target-count-estimation matrix, a product of an output matrix and a Hermitian conjugate of the output matrix, the output matrix being generated by selecting at least one appropriate matrix or two or more appropriate matrixes for combination from among the pseudo-forward-spatial-average-covariance matrixes and the pseudo-backward-spatial-average-covariance matrixes according to either one or both of the relative elongation assumed between the targets and the S/N ratio of the reflected signal monitored by the monitoring unit, and performs Cholesky decomposition on the target-count-estimation matrix, and
the target-count estimating unit estimates the target count based on an index defined by using elements of an upper triangular matrix obtained as a result of the Cholesky decomposition.

6. The detection and ranging device according to claim 3, wherein
the target-count-estimation-matrix generating unit generates, as the target-count-estimation matrix, a product of an output matrix and a Hermitian conjugate of the output matrix, the output matrix being generated by selecting one appropriate matrix or two or more appropriate matrixes for combination from among the pseudo-forward-spatial-average-covariance matrixes and the pseudo-backward-spatial-average-covariance matrixes according to either one or both of the relative elongation assumed between the targets and the S/N ratio of the reflected signal monitored by the monitoring unit, and performs LDM decomposition on the target-count-estimation matrix, and
the target-count estimating unit estimates the target count based on an index defined by using diagonal elements of a diagonal matrix obtained as a result of the LDM decomposition or by using the diagonal elements of the diagonal matrix and elements of an upper triangular matrix obtained as a result of the LDM decomposition.

7. The detection and ranging device according to claim 3, wherein
the target-count-estimation-matrix generating unit generates, as the target-count-estimation matrix, a product of an output matrix and a Hermitian conjugate of the output matrix, the output matrix being generated by selecting one appropriate matrix or two or more appropriate matrixes for combination from among the pseudo-forward-spatial-average-covariance matrixes and the pseudo-backward-spatial-average-covariance matrixes according to either one or both of the relative elongation assumed between the targets and the S/N ratio of the reflected signal monitored by the monitoring unit, and
the target-count estimating unit decomposes the target-count-estimation matrix through any one decomposition scheme of Cholesky decomposition, LU decomposition, and LDM decomposition according to either one or both of the relative elongation assumed between the targets and the S/N ratio of the reflected signal to estimate the target count by using an index suitable to the decomposition scheme and, when the estimation of the target count is not normally completed, performs another decomposition scheme to again estimate the target count by using an index suitable to the other decomposition scheme.

8. A detection and ranging method for a detection and ranging device with a transmission sensor array and a reception sensor array that is formed of n ($2 \leq n$) sensor elements, estimating a target count indicating the number of targets based on reflected signals of transmission signals sent from the transmission sensor array and reflected from the targets, and estimating an angle at which each reflected signal comes based on the target count, the detection and ranging method comprising:
generating correlation vectors based on outputs of the n sensor elements of the reception sensor array;
calculating a pseudo-forward-spatial-average-covariance matrix based on the generated correlation vectors;
calculating a pseudo-backward-spatial-average-covariance matrix based on the calculated pseudo-forward-spatial-average-covariance matrix;
generating, as a target-count-estimation matrix, a product of an output matrix and a Hermitian conjugate of the output matrix, the output matrix being generated by selecting one appropriate matrix or two or more appropriate matrixes for combination from among the calculated pseudo-forward-spatial-average-covariance matrixes and the calculated pseudo-backward-spatial-average-covariance matrixes; and
estimating the target count based on an index defined by using diagonal elements of a diagonal matrix or elements of an upper triangular matrix, as a result of matrix decomposition performed on the generated target-count-estimation matrix.

9. The detection and ranging method according to claim 8, further comprising monitoring either one or both of a relative elongation assumed between the targets and an S/N ratio of the reflected signal, wherein generating the target-count-estimation matrix by selecting one appropriate matrix or two or more appropriate matrixes for combination from among the pseudo-forward-spatial-average-covariance matrixes and the pseudo-backward-spatial-average-covariance matrixes according to either one or both of the monitored relative elongation assumed between the targets and the monitored S/N ratio of the reflected signal.

10. The detection and ranging method according to claim 9, wherein generating, as the target-count-estimation matrix, a product of an output matrix and a Hermitian conjugate of the output matrix, the output matrix being generated by selecting one appropriate matrix or two or more appropriate matrixes for combination from among the pseudo-forward-spatial-average-covariance matrixes and the pseudo-backward-spatial-average-covariance matrixes according to either one or both of the monitored relative elongation assumed between the targets and the monitored S/N ratio of the reflected signal;

performing LU decomposition on the target-count-estimation matrix; and estimating the target count based on an index defined by using elements of an upper triangular matrix obtained as a result of the LU decomposition.

11. The detection and ranging method according to claim 9, wherein generating, as the target-count-estimation matrix, a product of an output matrix and a Hermitian conjugate of the output matrix, the output matrix being generated by selecting at least one appropriate matrix or two or more appropriate matrixes for combination from among the pseudo-forward-spatial-average-covariance matrixes and the pseudo-backward-spatial-average-covariance matrixes according to either one or both of the monitored relative elongation assumed between the targets and the monitored S/N ratio of the reflected signal;

performing Cholesky decomposition on the target-count-estimation matrix; and estimating the target count based on an index defined by using elements of an upper triangular matrix obtained as a result of the Cholesky decomposition.

12. The detection and ranging method according to claim 9, wherein generating, as the target-count-estimation matrix, a product of an output matrix and a Hermitian conjugate of the output matrix, the output matrix being generated by selecting one appropriate matrix or two or more appropriate matrixes for combination from among the pseudo-forward-spatial-average-covariance matrixes and the pseudo-backward-spatial-average-covariance matrixes according to either one or both of the monitored relative elongation assumed between the targets and the monitored S/N ratio of the reflected signal;

performing LDM decomposition on the target-count-estimation matrix; and estimating the target count based on an index defined by using diagonal elements of a diagonal matrix obtained as a result of the LDM decomposition or by using the diagonal elements of the diagonal matrix and elements of an upper triangular matrix obtained as a result of the LDM decomposition.

13. The detection and ranging method according to claim 9, wherein generating, as the target-count-estimation matrix, a product of an output matrix and a Hermitian conjugate of the output matrix, the output matrix being generated by selecting one appropriate matrix or two or more appropriate matrixes for combination from among the pseudo-forward-spatial-average-covariance matrixes and the pseudo-backward-spatial-average-covariance matrixes according to either one or both of the monitored relative elongation assumed between the targets and the monitored S/N ratio of the reflected signal;

decomposing the target-count-estimation matrix through any one decomposition scheme of Cholesky decomposition, LU decomposition, and LDM decomposition according to either one or both of the relative elongation assumed between the targets and the S/N ratio of the reflected signal to estimate the target count by using an index suitable to the decomposition scheme; and performing, when the estimation of the target count is not normally completed, another decomposition scheme to again estimate the target count by using an index suitable to the other decomposition scheme.

* * * * *